(12) United States Patent
Lee et al.

(10) Patent No.: US 6,839,082 B2
(45) Date of Patent: Jan. 4, 2005

(54) SINGLE-CANISTER UNDERWATER STEREOCAMERA SYSTEM WITH DISTANCE MEASUREMENT FUNCTION

(75) Inventors: Pan-Mook Lee, Taejon (KR);
Chong-Moo Lee, Taejon (KR);
Bong-Hwan Jeon, Taejon (KR);
Yong-Kon Lim, Taejon (KR);
Seok-Won Hong, Taejon (KR)

(73) Assignee: Korea Ocean Research and Development Institute, Ansan (KR)

( * ) Notice: Subject to any disclaimer, the term of this patent is extended or adjusted under 35 U.S.C. 154(b) by 908 days.

(21) Appl. No.: 09/750,844

(22) Filed: Dec. 28, 2000

(65) Prior Publication Data

US 2002/0044202 A1 Apr. 18, 2002

(30) Foreign Application Priority Data

Sep. 1, 2000 (KR) ........................................ 2000-51606

(51) Int. Cl.⁷ ............................. H04N 7/18; H04N 9/47
(52) U.S. Cl. ............................. 348/81; 348/47; 348/374
(58) Field of Search ........................... 348/47, 81, 373, 348/376, 374; 396/25, 26, 27, 28, 29, 325, 329

(56) References Cited

U.S. PATENT DOCUMENTS

| | | | | |
|---|---|---|---|---|
| 4,818,858 A | * | 4/1989 | Sorimachi et al. | 348/47 |
| 4,879,596 A | * | 11/1989 | Miura et al. | 348/47 |
| 5,119,189 A | * | 6/1992 | Iwamoto et al. | 348/47 |
| 5,778,268 A | * | 7/1998 | Inaba | 396/329 |
| 5,949,477 A | * | 9/1999 | Hoglin | 348/47 |
| 5,978,015 A | * | 11/1999 | Ishibashi et al. | 348/47 |
| 5,978,143 A | * | 11/1999 | Spruck | 348/47 |
| 6,701,081 B1 | * | 3/2004 | Dwyer et al. | 396/329 |

* cited by examiner

Primary Examiner—Aung Moe
Assistant Examiner—Jason Whipkey
(74) Attorney, Agent, or Firm—Cooper & Dunham LLP

(57) ABSTRACT

A single-canister underwater stereocamera system with a distance measurement function. In the camera system, a camera drive unit, holding two cameras on its camera base, is set in a parallel space defined between two support plates, and is operable by a motor unit, thus being movable along with the two cameras to the front or back. A lens drive unit, holding two lenses on two lens bases, is set in the parallel space to be operable by the motor unit so as to laterally move the two lenses to the left or right under the guide of a linear guide bearing. The motor unit controls the focus length of each of the two cameras and the moving distance of the two lenses at the same time. In the camera system, the actual distance of an underwater target object from the system is measured by sensing a rotated position of the encoder of the motor unit, taking advantage of the fact that the actual distance of the target object has a functional relation of 1:1 with the focus length of each of the cameras. This camera system measures the actual distance of the target object while compensating for the refraction errors of light beams passing through both the window and water. The camera system is also encased within a waterproof and pressure-proof cylindrical canister having a transparent window at its front end wall. This camera system is thus effectively usable in deep sea.

13 Claims, 5 Drawing Sheets

SINGLE-CANISTER UNDERWATER STEREOCAMERA SYSTEM WITH DISTANCE MEASUREMENT FUNCTION

BACKGROUND OF THE INVENTION

1. Field of the Invention

The present invention relates to a single-canister underwater stereocamera system with a distance measurement function capable of measuring the actual distance of a target underwater object from the system and, more particularly, to a single-canister underwater stereocamera system having two parallel cameras, two parallel lens units and a single motor, with the two parallel cameras and the two lens units being commonly operable by the single motor such that the two cameras are movable to the front and back and the two lens units are movable to the left and right, and so the stereocamera system effectively obtains a desired stereoscopic image of a target underwater object regardless of the distance of the target object from the camera system.

2. Description of the Prior Art

In recent years, techniques for controlling unmanned underwater vehicles (UUV) or remotely operated vehicles (ROV) performing a variety of underwater works have been quickly and highly developed. Therefore, it is possible for an operator in a surface vessel to direct an unmanned underwater vehicle (UUV) or a remotely operated vehicle (herein below, the UUV and ROV will be referred to simply as "ROV" for ease of description), submerged under water to perform a desired work in deep-sea, through a remote control process. In order to perform a deep-sea work using such an ROV, it is necessary to use underwater camera systems. In order to allow an operator to observe the area in front of an ROV and to actuate a robot arm of the ROV, most conventional ROVs are equipped with one monocular camera system. Of course, some ROVs provided with two or more monocular camera systems have been proposed and used. However, in the case of an ROV with such two or more monocular camera systems, the object of the installation of said camera systems is to observe two or more different sites covered by the camera systems. This means that each camera system is limited in its viewing angle. Such a conventional monocular camera system fails to provide a stereoscopic image, and so an operator on the surface vessel cannot measure or calculate the actual distance of a target underwater object from the camera system. Therefore, it is very difficult to perform a desired underwater work using such an ROV. In addition, the conventional monocular camera system undesirably causes an operator to finally feel fatigue in his eyes when he controls the ROV for a lengthy period of time while viewing the flat images displayed on a screen. Therefore, it is desired to provide an underwater stereocamera system capable of forming stereoscopic images.

In the prior art, such an underwater stereocamera system capable of forming a stereoscopic image of an underwater object has been typically accomplished by two cameras installed on a single camera platform. In such a case, the two cameras commonly track a target underwater object to form images of said object, and combine the images into a stereoscopic image of the object. However, such a typical stereocamera system is problematic in that it is necessary to precisely control the two cameras so as to allow them to commonly track the target object. It is also necessary to precisely control the focuses of the two cameras, and so the construction of the control unit for such typical stereocamera systems is undesirably complicated. Another problem of such a typical stereocamera system resides in that the system has to be precisely installed on a camera platform, thus requiring the platform to be precisely machined.

In recent years, an underwater stereocamera system capable of forming a stereoscopic image of an underwater object using two parallel cameras has been proposed and used. This stereocamera system is designed on the basis of the fact that there is a linear relation between the variation in the focus length of the two parallel cameras and the variation in the interlens distance of the cameras when the cameras simultaneously track a far-distant object.

However, this underwater stereocamera system is problematic in that it cannot form a desired clear stereoscopic image of a near-distant object since the expected linear relation between the variation in the focus length of the two parallel cameras and the variation in the interlens distance of the cameras is not maintained when the cameras simultaneously track such a near-distant object. In addition, the underwater stereocamera system with such two parallel cameras is designed such that both the variation in the focus length of the cameras and the variation in the interlens distance of the cameras are linearly controlled by adjusting the intercamera distance in place of adjusting the interlens distance of the cameras for ease of mechanical fabrication of the camera system. However, such a structure of the stereocamera system undesirably enlarges the dimensional error of stereoscopic images of near-distant objects.

As well known to those skilled in the art, the visual range under water is exceedingly limited. In addition, the underwater works, performed by the robot arms of ROVs, are typically limited to near-distant objects positioned within a reaching range of 1~2 m. Therefore, it is practically necessary for underwater stereocamera systems to form clear stereoscopic images of near-distant target objects in place of far-distant objects. However, the conventional underwater stereocamera system with two parallel cameras cannot form desired clear stereoscopic images of near-distant objects even though it can obtain such desired clear stereoscopic images of far-distant objects. Therefore, it is necessary to provide an underwater stereocamera system capable of forming desired clear stereoscopic images of near-distant objects under water.

During an underwater work performed by an ROV, it is possible to improve the operational efficiency of an operator of the ROV by allowing the operator to measure or calculate the actual distance of a target object. A method of measuring the actual distance of a target underwater object using sonar has been proposed and used. However, the actual distance measurement performed by the conventional sonar is limited to large-sized objects, of which the actual sizes are larger than an effective critical size determined by the operational frequency of supersonic waves radiated from the sonar. Therefore, the conventional sonar cannot be used for measuring the actual distances of small-sized objects under water. Therefore, it is necessary to provide a means capable of visually measuring the actual distances of small-sized objects under water.

SUMMARY OF THE INVENTION

Accordingly, the present invention has been made keeping in mind the above problems occurring in the prior art, and an object of the present invention is to provide a single-canister underwater stereocamera system with a distance measurement function, which is fabricated by encasing a stereocamera within a sealed and pressure-proof canister having a window, and which is designed to effectively form a clear stereoscopic image of a near-distant or far-distant object under water, and to compensate for the refraction errors of light beams transmitted through both the window of the canister and water, thus precisely measuring the actual distance of a target object.

In order to accomplish the above object, the present invention provides a single-canister underwater stereocamera system with a distance measurement function. This underwater stereocamera system results from an improvement in the operational theory of a conventional underwater stereocamera system having two parallel cameras such that it effectively forms a clear stereoscopic image of a near-distant object in addition to a clear stereoscopic image of a far-distant object under water different from the conventional system. The camera system of this invention is fabricated by encasing a stereocamera within a sealed and pressure-proof canister having a window, and is designed to compensate for the refraction errors of light beams transmitted through both the window of the canister and water, thus precisely measuring the actual distance of a target object under water. In the camera system of this invention, the stereocamera is encased within a sealed and pressure-proof canister, and so it is possible to accomplish the recent trend of compactness and smallness of underwater stereocamera systems.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
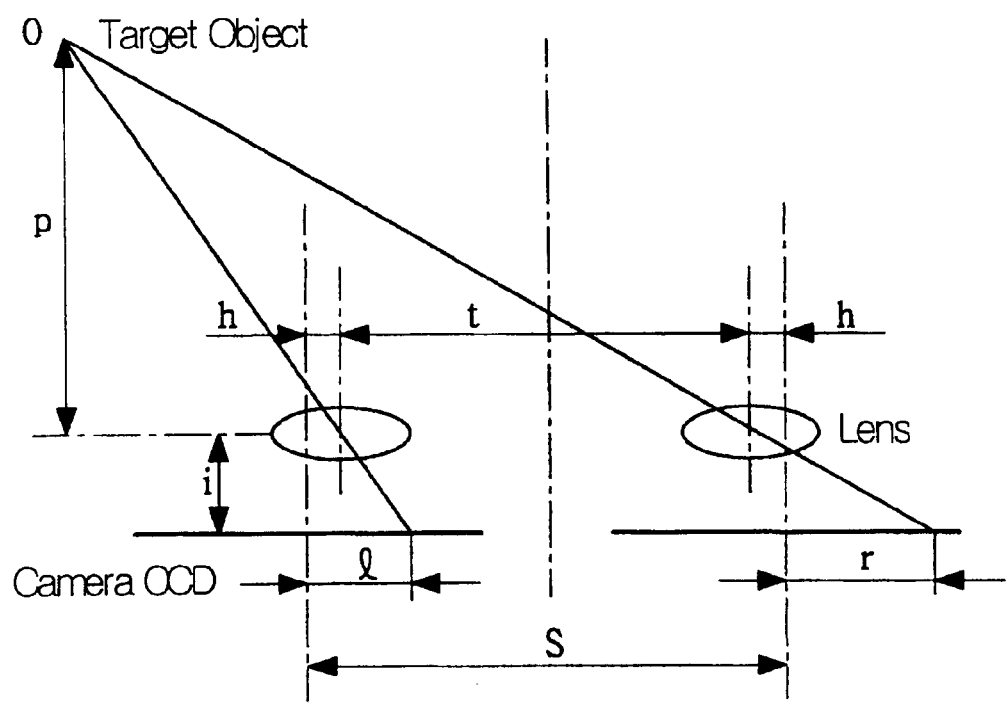
FIG. 1 is a diagram, showing the operational theory and geometrical dimensions of a parallel stereocamera system, used in designing a single-canister underwater stereocamera system of the present invention.

As shown in the drawings, FIGS. 1 to 5, the single-canister underwater stereocamera system with a distance measurement function of this invention comprises an upper support plate 31 and a lower support plate 30, which are assembled together by a plurality of support columns 29 while defining a parallel space between them. A motor unit, consisting of a motor 1 provided with an encoder 2, is mounted on the lower support plate 30 within the parallel space. A camera drive unit, holding two cameras 11 on its camera base 9, is set in the parallel space to be operable by the motor unit, thus being movable along with the two cameras 11 to the front or back within the space. The camera system also has a lens drive unit holding two lenses 22 on two lens bases 21. The lens drive unit is set in the parallel space to be operable by the motor unit so as to laterally move the two lenses 22 to the left or right under the guide of a linear guide bearing 19.

In the above single-canister underwater stereocamera system, the lens drive unit comprises a sliding block 14 set within the parallel space to be movable forward or backward by the rotating action of a ball screw. Two levers 17, having the same construction, are symmetrically provided outside the two lens bases 21. Each of the levers 17 is mounted to the lower support plate 30 using a rotatable shaft 16 at its center and is positioned relative to both the sliding block 14 and each of the two lens bases 21 such that outside ends of two arms of the lever 17 come into contact with the sidewall of the sliding block 14 and the lens base 21, with a sliding roller 15 provided at the outside end of the first arm of the lever 17 for the sliding block 14 and a sliding link 18 provided at the outside end of the second arm for the lens base 21. Therefore, the moving force of the sliding block 14 is precisely and reliably transmitted to the two lens bases 21. The two lens bases 21, having the two lenses 22 thereon, is laterally movable along the linear guide bearing 19 in opposite directions such that the interlens distance between the two lenses 22 is adjustable by moving the two lens bases 21. Two coil springs 20 connect the two lens bases 21 to each other while biasing the two lens bases 21 so as to make the lens bases 21 always come into movable close contact with the sliding links 18 of the two levers 17. Therefore, the forward or backward movement of the sliding block 14 of the lens drive unit is converted into a lateral movement of the two lens bases 21 with the lenses 22 under the guidance of the linear guide bearing 19.

On the other hand, the motor unit controls the focus length of each of the two cameras 11 and controls the moving distance of the two lenses 22 at the same time.

The camera drive unit is provided with a harmonic drive 6 and a ball screw 7 for controlling the forward or backward movement of the two cameras 11. In such a case, the ball screw 7 is rotatable by the motor unit, while the harmonic drive 6 is rotatable in response to the rotating action of the ball screw 7 while being reduced in its rotating velocity by a predetermined reduction ratio.

The operational theory, construction and operational effect of the single-canister underwater stereocamera system of this invention will be described in detail herein below.

FIG. 1 is a diagram, showing the operational theory and geometrical dimensions of a parallel stereocamera system, used in designing the single-canister underwater stereocamera system of this invention. In this drawing, the arrangement of two parallel cameras and two lenses is shown. As shown in the drawing, the two parallel cameras are arranged such that they are synchronously movable to the front or back relative to a target object so as to focus the image of the object, while the two lenses are symmetrically movable in a lateral direction perpendicular to the moving direction of the two cameras. In the parallel stereocamera system of FIG. 1, the lateral moving distance "h" of each of the two lenses is expressed by the following expression (1).

$$h = s(1 - f/i)/2 \tag{1}$$

wherein,
p: a perpendicular distance between the target object and the each of the two lenses
s: an intercamera distance
t: an interlens distance h: a lateral moving distance of each of the two lenses i: a perpendicular distance between each lens and the CCD of an associated camera l: a distance from the center of the CCD to an image focused on by the left-hand camera r: a distance from the center of the CCD to an image focused on by the right-hand camera In the parallel stereocamera system of FIG. 1, the focus length "f" of each of the lenses is a fixed constant, which is determined by selected lenses. In addition, the intercamera distance "s", which means the distance between the two cameras, is also fixed since the two cameras are fixed on a camera platform. Therefore, the lateral moving distance "h" of each of the two lenses has a functional relation of 1:1 with the perpendicular distance "i" between each lens and the charge coupled device (CCD) of an associated camera. The single-canister underwater stereocamera system of this invention is designed using such a functional relation of 1:1 between the lateral moving distance "h" of each of the two lenses and the perpendicular distance "i" between each lens and the CCD of an associated camera. The focus length and the interlens distance of the camera system of this invention can be thus simultaneously controlled by a single input control signal.

Figure 2:
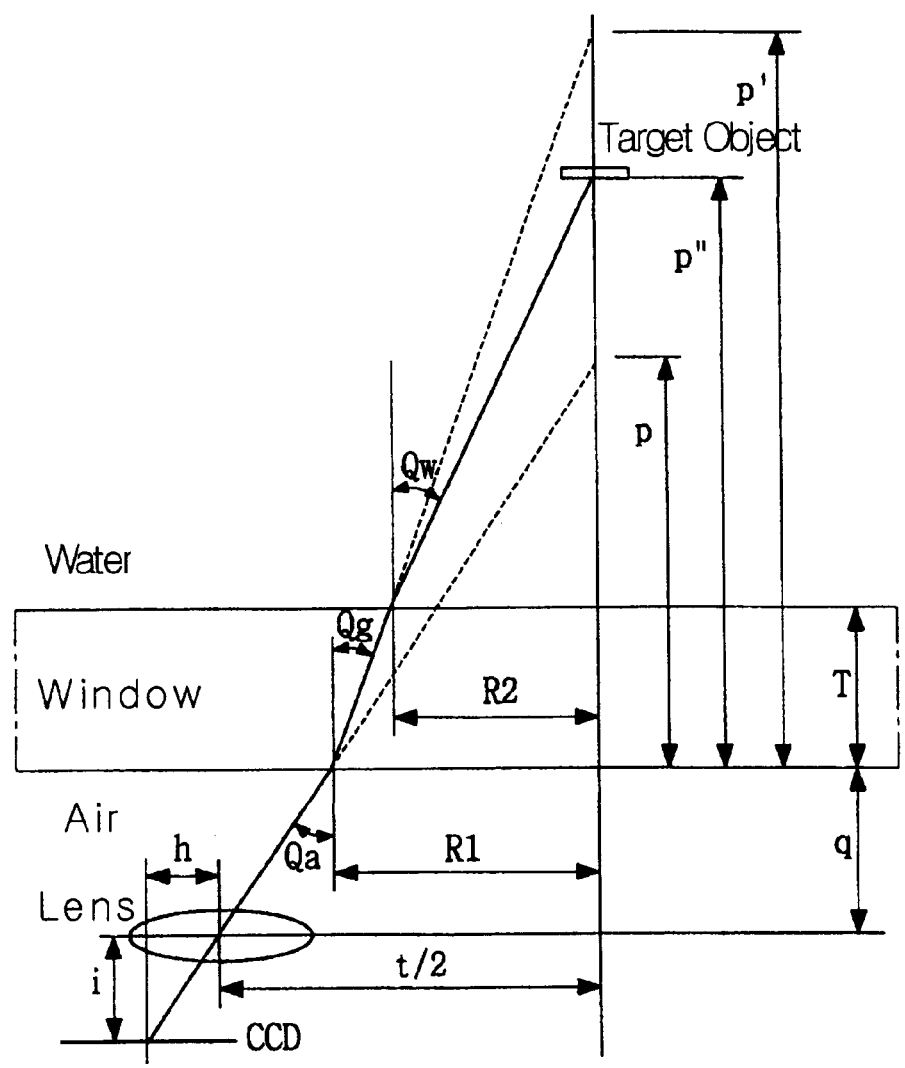
FIG. 2 is a diagram, showing the geometrical dimensions of a single-canister underwater stereocamera system in accordance with the present invention when measuring the actual distance of an underwater object.

FIG. 2 is a diagram, showing the geometrical dimensions of a single-canister underwater stereocamera system in accordance with the present invention when measuring the actual distance of an underwater object. In the single-canister underwater stereocamera system of FIG. 2, the actual distance p" of a target object from the inside surface of the window of a canister encasing the camera system is expressed by the following expression (2).

$$p'' = \frac{k_2}{p'}(p' - T)\sqrt{R_1^2 + p'^2 - (R_1/k_2)^2} + T \qquad (2)$$

wherein, $R_1 = t/2 - qh/i$ $p' = \sqrt{k_1^2 + (k_1^2 - 1)(h/i)^2}\left(\frac{ti}{2h} - q\right)$:

an ideal distance of the target object $k_1 = \sin\theta_a/\sin\theta_g$: a Snell ratio of the light beam transmitted from the window into air $k_2 = \sin\theta_g/\sin\theta_w$: a Snell ratio of the light beam transmitted from water into the window q=a distance between the window and the lens T=a thickness of the window p=a visual distance of the target object from the inside surface of the window p'=an ideal distance of a point, at which the light beam passing through the window meets the central axis of the target object without being refracted by water, from the inside surface of the window p"=an actual distance of the target object from the inside surface of the window $\theta_a$=an incident angle of the light beam at the window $\theta_g$=a refraction angle of the light beam passing through the window $\theta_w$=a refraction angle of the light beam passing through water In the single-canister underwater stereocamera system of FIG. 2, the distance "q" between the window and the lens and the thickness "T" of the lens are fixed constants. Therefore, it is possible to calculate the actual distance p" of the target object from the inside surface of the window of the camera system using the above expression (2) with the relation of the interlens distance "t" to both the intercamera distance "s" and the lateral moving distance "h" of each lens, t=s−2h, when the lateral moving distance "h" of the lens and the perpendicular distance "i" between the lens and the camera CCD are obtained.

Figure 3:
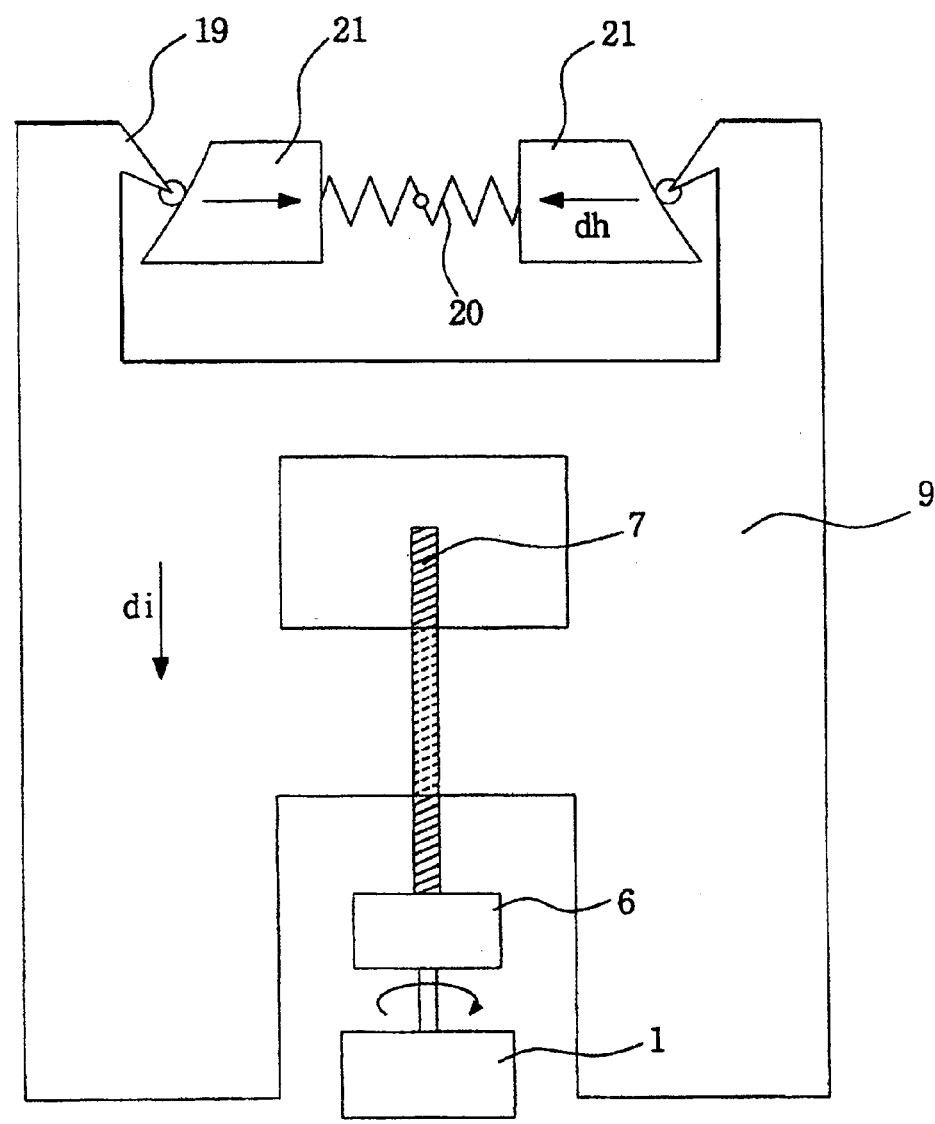
FIG. 3 is a diagram, schematically showing the operational theory of the underwater stereocamera system of this invention.

FIG. 3 is a diagram, schematically showing the operational theory of the single-canister underwater stereocamera system of this invention. In order to form a stereoscopic image of a target object, this underwater stereocamera system is designed such that the camera base 9 is movable to the front or back by the motor 1 and the ball screw 7, and the two lens bases 21 are laterally movable to the left or right by a mechanical sliding block installed in front of the camera, with the moving distance of the lens corresponding to the moving distance of the camera. In the system of FIG. 3, it is thus necessary to precisely machine the mechanical sliding block 9. In addition, the sliding block 9 of the above system is undesirably pressed down in a camera moving direction, and so it is difficult to smoothly move the lens bases 21. In order to overcome such problems, the stereocamera system of this invention is designed using a mechanical amplification device as follows.

Figure 4:
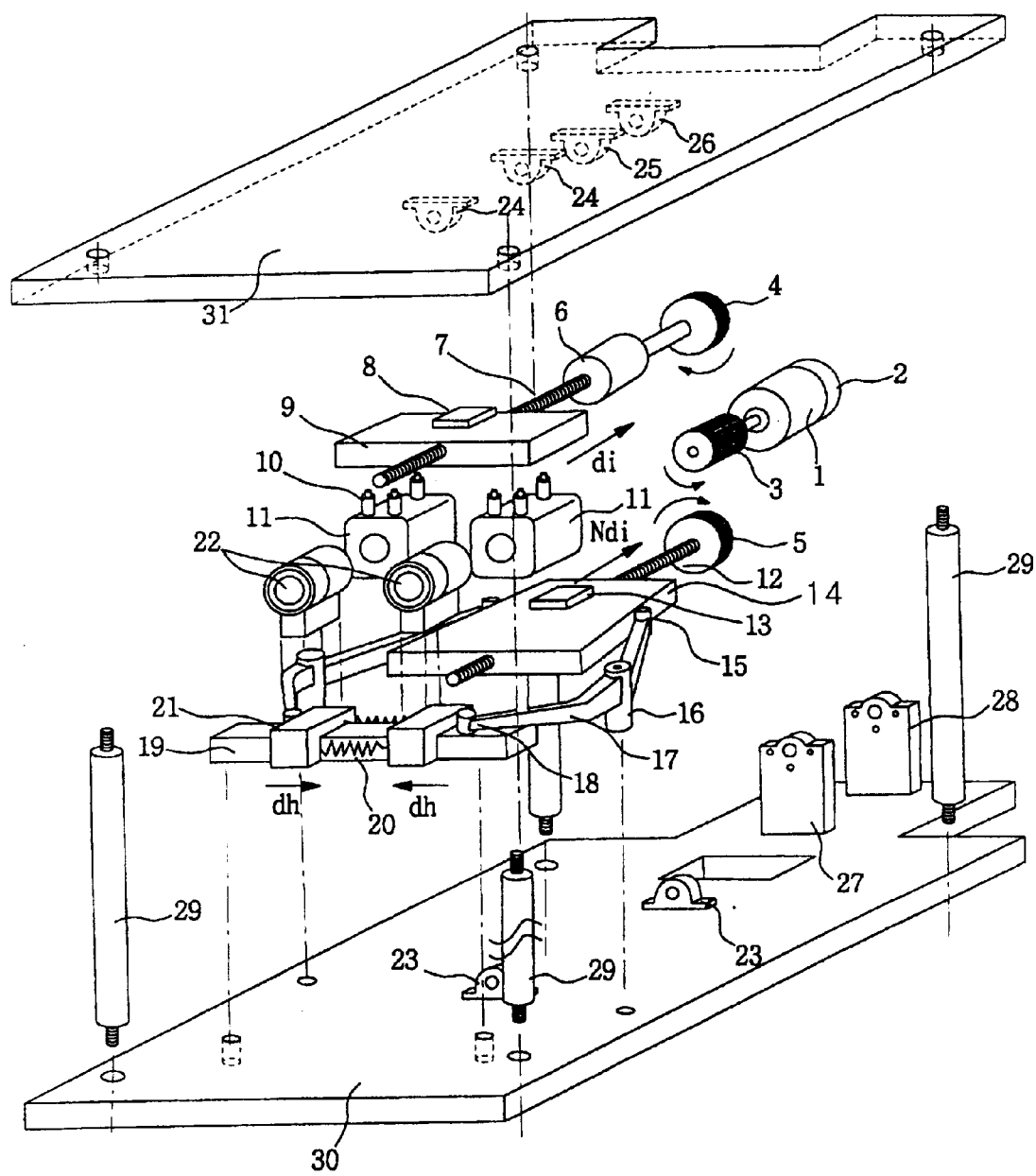
FIG. 4 is an exploded perspective view, showing the construction of the single-canister underwater stereocamera system of this invention.

FIG. 4 is an exploded perspective view, showing the internal construction of a mechanical amplification device for the single-canister underwater stereocamera system of this invention capable of forming a desired cleaner stereoscopic image of a far-distant target object or a near-distant target object. In the camera system of this invention, the controllable rotating force of the motor 1 provided with the encoder 2 is transmitted to the camera drive gear 4 of the camera drive unit through the output gear 3 mounted to the rotating shaft of the motor 1. The drive shaft of the camera drive unit is connected to the camera drive gear 4 and has the harmonic drive 6, thus being rotatable while being reduced in its rotating velocity by a reduction ratio of N. Due to such a rotating action of the camera drive shaft, the ball screw 7 connected to the camera drive shaft moves a ball screw box 8 forward or backward, thus finally moving the camera base 9 to the front or back.

The two cameras 11 are commonly mounted to the camera base 9, with a level adjusting unit 10 provided at the junction of each camera 11 and the camera base 9 for allowing a user to adjust the height of each camera 11 relative to the camera base 9 as desired. In the stereocamera system of this invention, it is possible to control the focus length of each camera 11 by controllably operating the motor 1.

A lens drive gear 5 of the lens drive unit engages with the motor output gear 3 of the motor unit. This lens drive gear 5 is rotated by the motor output gear 3, thus rotating a ball screw 12 in a direction. Therefore, a ball screw box 13 is moved forward or backward by the rotating action of the ball screw 12. Such a movement of the ball screw box 13 moves the sliding block 14 of the lens drive unit in the same direction. In such a case, the moving velocity of the sliding block 14 is higher than that of the camera base 9 by N times. Therefore, it is possible to provide a desired mechanical amplification device for the camera system of this invention, which allows the lens drive unit to move at a higher velocity than that of the camera drive unit by N times in accordance with a variation in the focus length of each camera 11.

Such a mechanical amplification device reduces the error, caused by backlash or mechanical clearance of the camera system, by N times, and so it is possible to precisely control the position of the cameras 11 and lenses 22 of the camera system. In this camera system, opposite side surfaces of the sliding block 14 are inclined at an angle of inclination. Therefore, it is possible to reduce the pressure, acting on the linear guide bearing 19 in a vertical direction, by N times, and so the lenses 22 can be smoothly movable.

The stereocamera system of this invention also has a mechanism for converting the forward or backward movement of the sliding block 14 into a lateral movement of the lenses 22 as follows. That is, one lever 17, mounted to the rotatable shaft 16 at its center, is positioned relative to both the sliding block 14 and each of two lens bases 21 such that the outside ends of the two arms of said lever 17 come into contact with the sidewall of the sliding block 14 and the lens base 21. In such a case, the outside end of one arm of the lever 17 for the sliding block 14 has the sliding roller 15, while the outside end of the other arm for the lens base 21 has the sliding link 18. Therefore, it is possible to precisely and reliably transmit the forward or backward moving force of the sliding block 14 to the two lens bases 21. In the camera system of FIG. 4, two levers 17 having the same construction are symmetrically provided outside the two lens bases 21. The two lenses 22 are fixed on the two lens bases 21. The two lens bases 21 are set on the linear guide bearing 19 such that they are laterally movable along the bearing 19 in opposite directions. It is thus possible to adjust the interlens distance between the two lenses 22 by properly moving the two lens bases 21. The two lens bases 21 are connected to each other by two coil springs 20, and so the bases 21 are always brought into close contact with the sliding links 18 of the two levers 17.

In the present invention, the positional variation of the camera base 9 and the positional variation of the lenses 22 are calculated by sensing the rotated position of the encoder 2 of the motor 1. In addition, the actual distance of a selected target object under water is calculated using the above expression (2). The underwater stereocamera system of this invention is also designed such that it forms a desired clear stereoscopic image of a far-distant target object or a near-distant target object, and so it is possible for the camera system of this invention to precisely measure the actual distance of a selected target object regardless of its being a far-distant or near-distant object.

As shown in FIG. 4, the upper and lower support plates 31 and 30 are firmly assembled together by four support columns 29 provided at corners of the plates 30 and 31. The two ball screws 7 and 12 of the camera and lens drive units are held on the two plates 30 and 31 by ball screw support brackets 23 and 24. The harmonic drive 6 and the drive shaft of the camera drive unit are held by two bearings 25 and 26 of the upper plate 31. On the other hand, the motor unit, consisting of the motor 1 and the motor output gear 3, is held on the lower support plate 30 by two motor brackets 27 and 28.

Figure 5:
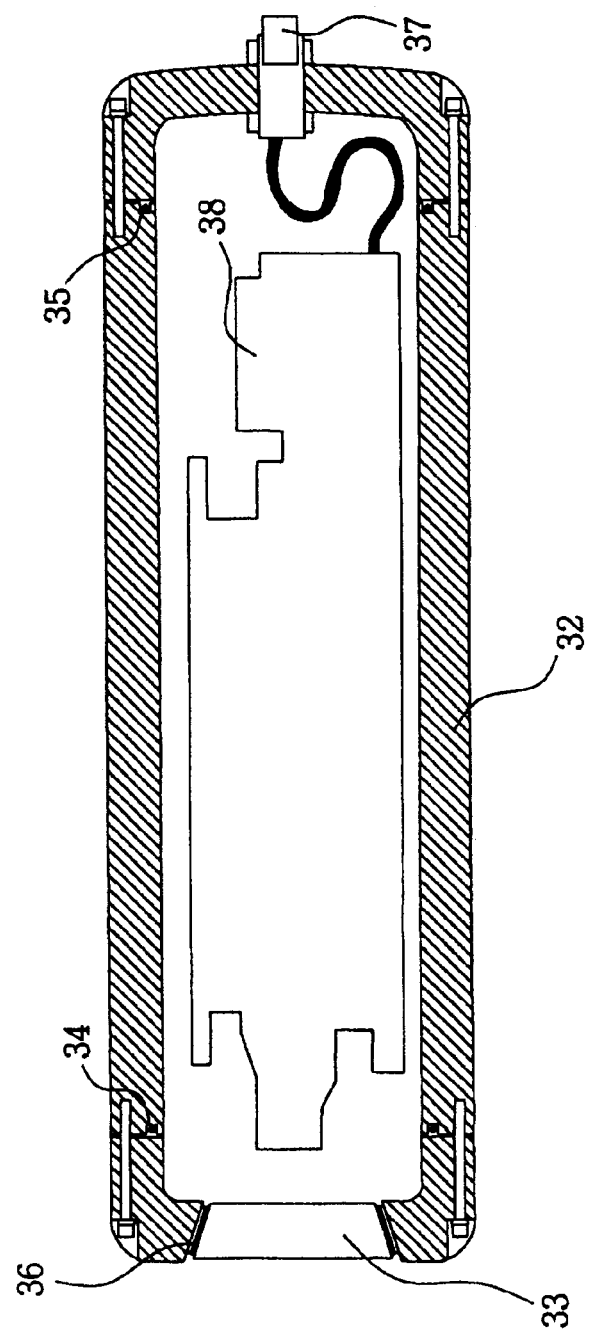
FIG. 5 is a sectional view, showing the construction of a waterproof and pressure-proof canister for the underwater stereocamera system of this invention.

FIG. 5 is a sectional view, showing the construction of a waterproof and pressure-proof canister for the underwater stereocamera system of this invention. As shown in the drawing, the above-mentioned camera system 38 of this invention is encased within a waterproof and pressure-proof canister 32 having a cylindrical profile. The front and rear ends of the canister 32 are closed by waterproof lids, with an O-ring 34 or 35 set along the junction of the canister 32 and each lid of the canister 32, and so the canister 32 accomplishes a desired sealing effect preventing leakage of water and enduring water pressure. A window 33, made of a transparent acrylic material and having a frustoconical shape, is set at the center of the front lid of the canister 32, with a frustoconical annular silicone pad 36 set along the junction of the front lid of the canister 32 and the outside edge of the window 33. Therefore, a desired waterproofing effect is accomplished at the junction of the front lid of the canister 32 and the outside edge of the window 33. Such a frustoconical shape of both the window 33 and the silicone pad 36 allows the window 33 to firmly maintain its position on the front lid of the canister 32 without being unexpectedly removed from the front lid when water pressure is axially applied to the window 32 from the outside of the canister 32. Therefore, it is not necessary to provide a separate locking means for locking the window 33 to the front lid of the canister 32. A waterproof connector 37 is set at the center of the rear lid of the canister 32, and connects a signal transmitting cord and a power cord to the stereocamera system 38 encased within the canister 32, and so it is possible to apply control signals and electric power to the stereocamera system of this invention.

The stereoscopic image of a target object, formed by the camera system of this invention, is displayed on the screen of a conventional polarized stereoscopic monitor. An operator can see the stereoscopic image on the screen using polarized glasses. In addition, the actual distance of a target object is calculated by sensing the rotated angle of the encoder, and is digitally displayed on the screen of the monitor. Therefore, the actual distance of any target object along with a clear stereoscopic image of the object is automatically and digitally displayed on the screen of the monitor when the operator controls the stereocamera system of this invention to focus on the underwater target object under water. The operator is thus able to know the actual distance of any target object while observing the clear stereoscopic image of the object displayed on the screen of the monitor. The single-canister underwater stereocamera system of this invention is encased within a waterproof and pressure-proof canister having a compact cylindrical shape, and so the system is easily mounted to a desired position at the front part of a conventional ROV. When the camera system of this invention is mounted on a camera platform designed to be easily controlled in its vertical and lateral angles, it is possible for the camera system to form a desired clear stereoscopic image of any underwater target object without being limited in its viewing angle.

As described above, the present invention provides a single-canister underwater stereocamera system with a distance measurement function capable of measuring the actual distance of a target underwater object from the system. In the camera system of this invention, two cameras and two lenses are simultaneously controlled in response to a single input control signal. The camera system is thus simplified in its construction, and is easily and conveniently operated. This camera system also effectively obtains a desired clear stereoscopic image of a target object under water regardless of the actual distance of the object from the camera system. In addition, the actual distance of a target object is calculated by sensing the rotated angle of the encoder of a motor unit, and is digitally displayed on the screen of a monitor. It is thus possible for the camera system of this invention to display the actual distance of any target object along with a clear stereoscopic image of the object on the screen of the monitor when the operator on a surface vessel controls the stereocamera system to focus on the target object under water. The operator on the surface vessel is thus able to know the actual distance of any target object under water while observing the stereoscopic image of the object displayed on the screen. The camera system is encased within a waterproof and pressure-proof canister having a frusto-conical window capable of enduring high pressure of water, thus being effectively usable in deep sea. In addition, since this camera system is encased within the compact cylindrical canister, the camera system is easily mounted to a desired position at the front part of a conventional ROV. This camera system encased within such a cylindrical canister is also easily mounted on a freely tiltable and rotatable camera platform. Therefore, this camera system effectively forms a desired clear stereoscopic image of any underwater target object without being limited in its viewing angle. This camera system also has a simple construction, and so the system is simply produced at low cost. Another advantage of the camera system of this invention resides in that it makes an operator less likely to feel fatigue in his eyes even when he controls an ROV for a lengthy period of time while viewing the stereoscopic images of target objects displayed on the screen of a monitor. This finally improves the operational efficiency of the operator while performing underwater work using such an ROV.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A single-canister underwater stereocamera system with a distance measurement function, comprising:

an upper support plate and a lower support plate, said upper and lower support plates being assembled together by a plurality of support columns while defining a parallel space between them;

a motor unit provided with an encoder and mounted on said lower support plate within said parallel space;

a camera drive unit holding two cameras on its camera base and set in said parallel space to be operable by said motor unit, thus being movable along with the two cameras to the front or back within the space; and a lens drive unit holding two lenses on two lens bases and set in said parallel space to be operable by said motor unit so as to laterally move the two lenses to the left or right under the guidance of a linear guide bearing.

2. The single-canister underwater stereocamera system according to claim 1, wherein said lens drive unit comprises:

a sliding block set within the parallel space to be movable forward or backward by a rotating action of a ball screw;

two levers having the same construction and symmetrically provided outside the two lens bases, each of said levers mounted to the lower support plate using a rotatable shaft at its center and positioned relative to both the sliding block and each of the two lens bases such that outside ends of two arms of said lever come into contact with a sidewall of said sliding block and said lens base, with a sliding roller provided at the outside end of a first arm of the lever for the sliding block and a sliding link provided at the outside end of a second arm for the lens base, thus precisely and reliably transmitting a moving force of the sliding block to the two lens bases;

the two lens bases having the two lenses thereon and laterally movable along the linear guide bearing in opposite directions such that an interlens distance between the two lenses is adjustable by moving the two lens bases; and a coil spring connecting the two lens bases to each other while biasing the two lens bases so as to make the lens bases always come into movable close contact with the sliding links of the two levers, whereby a forward or backward movement of the sliding block of the lens drive unit is converted into a lateral movement of the two lens bases with the lenses under the guidance of the linear guide bearing.

3. The single-canister underwater stereocamera system according to claim 2, wherein the ball screw, the sliding block, the two levers, the linear guide bearing and the spring of said lens drive unit also form a mechanical amplification device used for improving an operational precision when the lens drive unit controls the position of said two lenses.

4. The single-canister underwater stereocamera system according to claim 1, wherein a positional variation of said camera base and a positional variation of said two lenses are calculated by sensing a rotated position of said encoder of the motor unit, and an actual distance of an underwater target object is calculated from the following expression:

$$p'' = \frac{k_2}{p'}(p' - T)\sqrt{R_1^2 + p'^2 - (R_1/k_2)^2} + T$$

wherein, $R_1 = t/2 - qh/i$ $$p' = \sqrt{k_1^2 + (k_1^2 - 1)(h/i)^2} \left(\frac{ti}{2h} - q\right):$$

an ideal distance of the target object $k_1 = \sin\theta_a/\sin\theta_g$: a Snell ratio of the light beam transmitted from the window into air $k_2 = \sin\theta_g/\sin\theta_w$: a Snell ratio of the light beam transmitted from water into the window s=an intercamera distance t=an interlens distance h=a lateral moving distance of each of the two lenses i=a perpendicular distance between each lens and the CCD of an associated camera l=a distance from the center of the CCD to an image focused on the left—hand camera r=a distance from the center of the CCD to an image focused on the right—hand camera q=a distance between the window and the lens T=a thickness of the window p=a visual distance of the target object from the inside surface of the window p'=an ideal distance of a point, at which the light beam passing through the window meets the central axis of the target object without being refracted by water, from the inside surface of the window p"=an actual distance of the target object from the inside surface of the window $\theta_a$=an incident angle of the light beam at the window $\theta_g$=a refraction angle of the light beam passing through the window $\theta_w$=a refraction angle of the light beam passing through water.

5. The single-canister underwater stereocamera system according to claim 1, wherein said motor unit controls a focus length of each of the two cameras and controls a moving distance of the two lenses at the same time.

6. The single-canister underwater stereocamera system according to claim 1, wherein said camera drive unit is provided with a harmonic drive and a ball screw for controlling the forward or backward movement of the two cameras, said ball screw being rotatable by the motor unit and said harmonic drive thus being rotatable in response to a rotating action of the ball screw while being reduced in its rotating velocity by a predetermined reduction ratio.

7. The single-canister underwater stereocamera system according to claim 1, wherein an actual distance of an underwater target object from the camera system is measured by sensing a rotated position of said encoder of the motor unit, taking advantage of the fact that the actual distance of the target object has a functional relation of 1:1 with a focus length of each of said cameras.

8. The single-canister underwater stereocamera system according to claim 1, wherein the motor unit moves the two cameras to the front or back and the two lenses to the left or right at the same time, thus allowing the camera system to correctly focus on an underwater target object regardless of a distance of the target object from the system and to form a clear stereoscopic image of the target object.

9. The single-canister underwater stereocamera system according to claim 1, further comprising a waterproof and pressure-proof cylindrical canister having a transparent window at its front end wall, said canister encasing the camera system therein, thus allowing the camera system to be easily mounted on an underwater camera platform and to be usable in deep sea.

10. The single-canister underwater stereocamera system according to claim 1, wherein an actual distance of an underwater target object is measured while compensating for refraction errors of light beams passing through both a transparent window of a casing canister of the camera system and water.

11. The single-canister underwater stereocamera system according to claim 1, further comprising a pressure-proof cylindrical canister used for encasing said camera system therein, said canister being closed by a waterproof lid at each of front and rear ends thereof, with an O-ring set along a junction of each end of said canister and said waterproof lid, thus enhancing a waterproofing effect of the canister.

12. The single-canister underwater stereocamera system according to claim 11, wherein a window, made of a transparent acrylic material and having a frustoconical shape, is set on a front lid of the canister at a position in front of the camera system, with a frustoconical annular silicone pad set along a junction of the canister and an outside edge of said window.

13. The single-canister underwater stereocamera system according to claim 11, wherein a waterproof connector is set on a lid of the canister, and connects a signal transmitting cord and a power cord to the camera system, thus applying control signals and electric power to the camera system.

* * * * *